(12) United States Patent
Ohyoshi et al.

(10) Patent No.: US 12,716,006 B2
(45) Date of Patent: Aug. 25, 2026

(54) INK COMPOSITION FOR SCREEN PRINTING AND METHOD FOR PRODUCING PRINTED MATTER

(71) Applicant: NICHIAS CORPORATION, Tokyo (JP)

(72) Inventors: Kohei Ohyoshi, Tokyo (JP); Taira Yoshida, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 489 days.

(21) Appl. No.: 18/280,043

(22) PCT Filed: Dec. 28, 2021

(86) PCT No.: PCT/JP2021/048810
§ 371 (c)(1),
(2) Date: Sep. 1, 2023

(87) PCT Pub. No.: WO2022/209096
PCT Pub. Date: Oct. 6, 2022

(65) Prior Publication Data

US 2024/0076516 A1 Mar. 7, 2024

(30) Foreign Application Priority Data

Mar. 30, 2021 (JP) ................................ 2021-057752

(51) Int. Cl.
*B41M 1/12* (2006.01)
*C09D 7/20* (2018.01)
(Continued)

(52) U.S. Cl.
CPC ............ *C09D 123/16* (2013.01); *C09D 7/20* (2018.01); *C09D 11/033* (2013.01);
(Continued)

(58) Field of Classification Search
CPC ...... C09D 123/16; C09D 7/20; C09D 11/033; H01M 8/0284; H01M 8/0286; H01M 1/12; C09K 2003/1068; C09K 2200/0607
(Continued)

(56) References Cited

U.S. PATENT DOCUMENTS 5,932,645 A 8/1999 Kawanaka et al.
2009/0239014 A1 9/2009 Noguchi et al.
2011/0089646 A1* 4/2011 Omura .................... C08K 5/32 277/654

FOREIGN PATENT DOCUMENTS

CN 104231733 A 12/2014
JP 8-100147 A 4/1996
(Continued)

OTHER PUBLICATIONS

International Search Report dated Mar. 15, 2022, issued in counterpart International Application No. PCT/JP2021/048810, with English Translation. (5 pages).
(Continued)

*Primary Examiner* — Ruiyun Zhang
(74) *Attorney, Agent, or Firm* — WHDA, LLP

(57) ABSTRACT

Provided is an ink composition for screen printing that does not easily allow the generation of a printing defect or a rough surface portion in a printed matter even in the case of forming the printed matter having a thick thickness.
An ink composition for screen printing containing (a) a rubber-forming component, (b) a crosslinking agent, (c) a main solvent that dissolves the rubber-forming component and (d) a poor solvent that dissolves in the main solvent but does not dissolve in the rubber-forming component, in which a viscosity (0.1/s) obtained with an E-type viscometer at a temperature of 25° C. is 300 to 50000 Pa·s, a viscosity (10/s) obtained with the E-type viscometer at a temperature
(Continued)

of 25° C. is 50 to 1500 Pa·s, and a loss tangent (0.1 rad/s) obtained with the E-type viscometer at a temperature of 25° C. is 10 to 20.

3 Claims, 1 Drawing Sheet

(51) Int. Cl.

*C09D 11/033* (2014.01)
*C09D 123/16* (2006.01)
*H01M 8/0284* (2016.01)
*H01M 8/0286* (2016.01)
*C09K 3/10* (2006.01)

(52) U.S. Cl.

CPC ....... *H01M 8/0284* (2013.01); *H01M 8/0286* (2013.01); *B41M 1/12* (2013.01); *C09K 2003/1068* (2013.01); *C09K 2200/0607* (2013.01)

(58) Field of Classification Search

USPC .......................................................... 524/317

See application file for complete search history.

(56) References Cited

FOREIGN PATENT DOCUMENTS

| | | | |
|---|---|---|---|
| JP | 9-296865 | A | 11/1997 |
| JP | 2000-345139 | A | 12/2000 |
| JP | 2003-278917 | A | 10/2003 |
| JP | 2008-34383 | A | 2/2008 |
| WO | 2009/072553 | A1 | 6/2009 |

OTHER PUBLICATIONS

Written Opinion of the International Searching Authority (Form PCT/ISA/237) dated Mar. 15, 2022, issued in counterpart International Application No. PCT/JP2021/048810. (3 pages).

Extended (Supplementary) European Search Report dated Aug. 2, 2024, issued in counterpart EP Application No. 21935243.2. (5 pages).

* cited by examiner

[Fig.1]
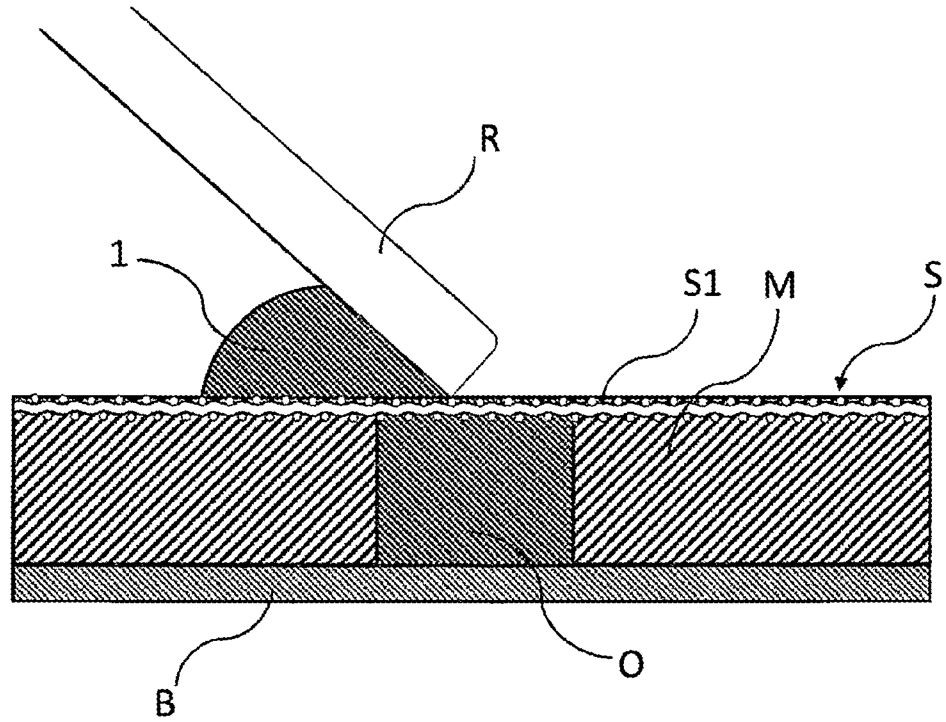
[Fig. 2]
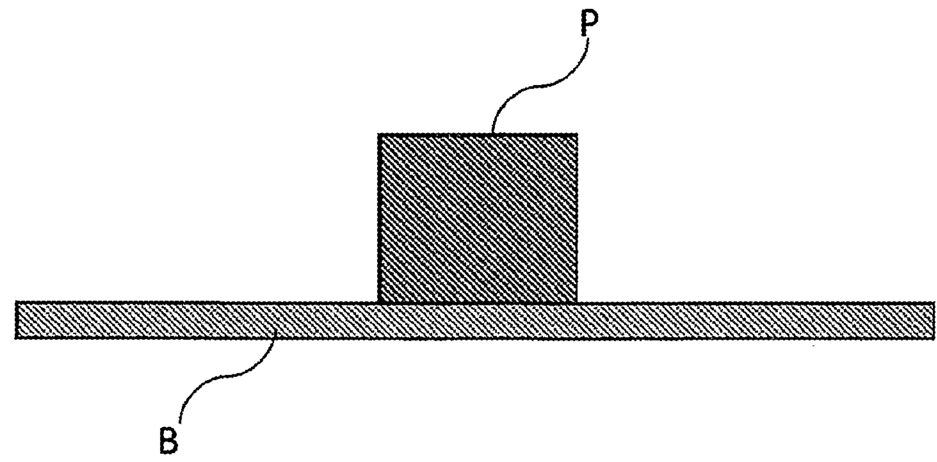

INK COMPOSITION FOR SCREEN PRINTING AND METHOD FOR PRODUCING PRINTED MATTER

TECHNICAL FIELD

The present invention relates to an ink composition for screen printing and a method for producing a printed matter.

BACKGROUND ART

It is known that, in order to seal hydrogen gas, oxygen gas or the like in fuel cells composed of a laminate structure of a number of cells, a gasket composed of a rubber material or a synthetic resin material having rubber-like elasticity and having a flat upper surface is provided on the surface of a substrate such as a separator constituting a fuel cell.

The gasket can be manufactured by a press molding method, an injection molding method or the like, but there has been a proposal of a manufacturing method in which screen printing is used in consideration of the takt time (for example, refer to Patent Literature 1 (Japanese Patent Laid-Open No. 2008-34383)).

CITATION LIST

Patent Literature

Patent Literature 1

Japanese Patent Laid-Open No. 2008-34383

SUMMARY OF INVENTION

Technical Problem

In the case of forming the gasket by screen printing, a procedure of the following (1) to (3) is performed.

(1) As shown in a schematic cross-sectional view of FIG. 1, a screen mask S having a mask M in which an opening O for paste application having a predetermined pattern that corresponds to the planar shape of the gasket has been formed is disposed on the lower part side of a screen S1 made of a stainless steel mesh or the like, and a substrate B is positioned and brought into contact with the lower part of such a screen mask S.

(2) A paste 1 composed of a non-crosslinked rubber material for gasket molding supplied to the upper part of the screen mask S is extruded into the opening O for paste application in the mask M by running a squeegee R and attached to the surface of the substrate B, then, the substrate B is separated from the screen mask S, and an applied paste layer P is formed on the surface of the substrate B in a predetermined printing pattern as shown in a schematic cross-sectional view corresponding to FIG. 2.

(3) The applied paste layer P is cured with heat or the like, thereby integrally molding a gasket (having a shape corresponding to the applied paste layer P) on a substrate 1.

Incidentally, there has been a demand for, as the gasket, a gasket having a relatively thick thickness of approximately 90 μm to 100 μm.

However, studies by the present inventors showed that, in a case where an attempt is made to manufacture a gasket having a thick thickness by screen printing using an ink composition having a relatively low viscosity (paste composed of a non-crosslinked rubber material), the ink composition is likely to adhere to a screen mask, it becomes difficult for the ink composition to be extruded and a printing defect such as print sagging is likely to occur.

Therefore, as an ink composition for screen printing (paste composed of a non-crosslinked rubber material), the use of an ink composition having a high thixotropic property or an ink composition having a high viscosity has been considered; however, as a result of studies by the present inventors, it was clarified that, in the case of using an ink composition having a high thixotropic property or an ink composition having a high viscosity, rough surface portions such as mesh marks (screen marks) are likely to be generated on the surface of a gasket to be obtained, and the appearance or the performance is likely to become poor.

With such a circumstance, an objective of the present invention is to provide an ink composition for screen printing that does not easily allow the generation of a printing defect or a rough surface portion in a printed matter even in the case of forming the printed matter having a thick thickness and a method for producing a printed matter using such an ink composition for screen printing.

Solution to Problem

In order to achieve the above-described objective, as a result of intensive studies, the present inventors found that the above-described technical problem can be solved with an ink composition for screen printing containing (a) a rubber-forming component, (b) a crosslinking agent, (c) a main solvent that dissolves the rubber-forming component and (d) a poor solvent that dissolves in the main solvent but does not dissolve in the rubber-forming component, in which a viscosity (0.1/s) obtained with an E-type viscometer at a temperature of 25° C. is 300 to 50000 Pa·s, a viscosity (10/s) obtained with the E-type viscometer at a temperature of 25° C. is 50 to 1500 Pa·s, and a loss tangent (0.1 rad/s) obtained with the E-type viscometer at a temperature of 25° C. is 10 to 20, and completed the present invention based on the present finding.

That is, the present invention provides (1) an ink composition for screen printing comprising:
- (a) a rubber-forming component;
- (b) a crosslinking agent;
- (c) a main solvent that dissolves the rubber-forming component; and
- (d) a poor solvent that dissolves in the main solvent but does not dissolve in the rubber-forming component,
- wherein a viscosity (0.1/s) obtained with an E-type viscometer at a temperature of 25° C. is 300 to 50000 Pa·s,
- a viscosity (10/s) obtained with the E-type viscometer at a temperature of 25° C. is 50 to 1500 Pa·s, and
- a loss tangent (0.1 rad/s) obtained with the E-type viscometer at a temperature of 25° C. is 10.0 to 20.0, (2) A method for producing a printed matter, wherein the ink composition for screen printing according to (1) is screen-printed and then cured, thereby forming a printed matter, and (3) The method for producing a printed matter according to (2), wherein the printed matter is a gasket.

Hereinafter, (c) the main solvent that dissolves the rubber-forming component will be referred to as "(c) main solvent", and (d) the poor solvent that dissolves in the main solvent and does not dissolve in the rubber-forming component will be referred to as "(d) poor solvent" as appropriate, respectively.

Advantageous Effects of Invention

According to the present invention, (d) the poor solvent that dissolves in the main solvent but does not dissolve in the rubber-forming component is employed as a solvent that constitutes the ink composition for screen printing together with (c) the main solvent that dissolves the rubber-forming component, whereby the cohesion of the rubber-forming component in the ink composition is improved, the adhesion to screen masks is reduced, and the extrudability is improved, which makes it possible to reduce printing defects.

In addition, according to the present invention, the viscosity (0.1/s) of the ink composition for screen printing obtained with an E-type viscometer at a temperature of 25° C. is 300 to 50000 Pa·s, whereby it is possible to suitably suppress print sagging, and, the viscosity (10/s) of the ink composition for screen printing obtained with an E-type viscometer at a temperature of 25° C. is 50 to 1500 Pa·s, whereby it is possible to suitably guarantee printability.

Furthermore, according to the present invention, the loss tangent (0.1 rad/s) of the ink composition for screen printing obtained with an E-type viscometer at a temperature of 25° C. is 10.0 to 20.0, whereby the adhesion of the ink composition to screen masks is reduced, and the extrudability improves, which makes it possible to more effectively suppress the generation of printing defects.

Therefore, according to the present invention, it is possible to provide an ink composition for screen printing that does not easily allow the generation of a printing defect or a rough surface portion in a printed matter even in the case of forming the printed matter having a thick thickness and a method for producing a printed matter using such an ink composition for screen printing.

BRIEF DESCRIPTION OF DRAWINGS

FIG. 1 is a schematic cross-sectional view for describing a printing method by screen printing.

FIG. 2 is a schematic cross-sectional view for describing a printed matter obtained by screen printing.

DESCRIPTION OF EMBODIMENTS

An ink composition for screen printing according to the present invention contains (a) a rubber-forming component, (b) a crosslinking agent, (c) a main solvent that dissolves the rubber-forming component and (d) a poor solvent that dissolves in the main solvent but does not dissolve in the rubber-forming component, wherein the viscosity (0.1/s) obtained with an E-type viscometer at a temperature of 25° C. is 300 to 50000 Pa·s, the viscosity (10/s) obtained with an E-type viscometer at a temperature of 25° C. is 50 to 1500 Pa·s, and the loss tangent (0.1 rad/s) obtained with an E-type viscometer at a temperature of 25° C. is 10 to 20.

In the ink composition for screen printing according to the present invention, (a) the rubber-forming component means a component composed of (a-1) only a rubber component or (a-2) a mixture of a rubber component and a plasticizer.

In the ink composition for screen printing according to the present invention, as the rubber component constituting (a) the rubber-forming component, specifically, at least one selected from silicone rubber, acrylic rubber, chloroprene rubber, polysulfide rubber, urethane rubber, butyl rubber, natural rubber, ethylene-propylene rubber, nitrile rubber, fluoro rubber, isoprene rubber, butadiene rubber, styrene-butadiene rubber, acrylonitrile-butadiene rubber, ethylene-propylene-diene rubber, chlorosulfonated polyethylene rubber, polyisobutylene, modified silicone and the like can be exemplified, one or more selected from ethylene-propylene-diene rubber, fluoro rubber and acrylonitrile-butadiene rubber are preferable, and ethylene-propylene-diene rubber is more preferable.

In the ink composition for screen printing according to the present invention, in a case where (a) the rubber-forming component is composed of (a-2) the mixture of a rubber component and a plasticizer, the plasticizer is not particularly limited as long as the plasticizer is capable of adjusting the polymer viscosity of the rubber-forming component to be within a desired range and can be selected as appropriate from substances that are well known as plasticizers or softeners for rubber.

Specifically, for example, in a case where the rubber component is ethylene-propylene-diene rubber (EPDM), one or more selected from ethylene-propylene rubber (EPM), fatty acid ester, phthalate ester, aliphatic dibasic acid ester, phosphate ester, trimellitate, polyester, ricinoleic acid ester, acetate ester, mineral oil and the like can be exemplified as the plasticizer constituting the rubber-forming component.

In the ink composition for screen printing according to the present invention, the polymer viscosity (0.1 rad/s) of (a) the rubber-forming component is preferably 2000 to 50000 Pa·s, more preferably 10000 to 45000 Pa·s and still more preferably 10000 to 40000 Pa·s.

In the ink composition for screen printing according to the present invention, since the polymer viscosity (0.1 rad/s) of (a) the rubber-forming component is within the above-described range, when the ink composition has been extruded from a screen mask during screen printing and then an extruded matter has been dried or heated and cured with a crosslinking agent, it is possible to easily reduce the viscosity of the extruded matter to a desired range and to easily improve the leveling property (surface flatness) of the extruded matter.

In the present application document, the polymer viscosity (0.1 rad/s) of the rubber-forming component means a value obtained by measurement with an E-type viscometer (RHEOMETER MCR301 manufactured by Anton Paar GmbH) using a parallel plate (PP12) having a diameter of 12 mm under conditions of 120° C., an angular frequency of 0.1 radians/second and a strain of 0.1% in a state where a polymer-forming component is dissolved in the main solvent and then dried with hot air at 60° C. for 12 hours or longer to completely remove the solvent.

The content of the rubber component in the ink composition for screen printing according to the present invention is preferably 15.0 to 60.0 mass %, more preferably 20.0 to 50.0 mass % and still more preferably 28.0 to 40.0 mass %.

In a case where the ink composition for screen printing according to the present invention contains a plasticizer in the rubber-forming component, the content of the plasticizer in the ink composition for screen printing according to the present invention is preferably 1.0 to 20.0 mass %, more preferably 3.0 to 18.0 mass % and still more preferably 5.0 to 15.0 mass %.

In addition, the content of (a) the rubber-forming component in the ink composition for screen printing according to the present invention is preferably 15.0 to 80.0 mass %, more preferably 30.0 to 80.0 mass %, still more preferably 35.0 to 65.0 mass % and far still more preferably 40.0 to 60.0 mass %.

In the ink composition for screen printing according to the present invention, (b) the crosslinking agent is not particularly limited as long as the crosslinking agent is capable of crosslinking the rubber component in (a) the rubber-forming component, can be selected as appropriate from well-known crosslinking agents and is preferably a thermal crosslinking agent.

In the ink composition for screen printing according to the present invention, as (b) the crosslinking agent, specifically, one or more selected from sulfur, an organic peroxide, a quinoid compound, a phenolic resin, an amine, a metal oxide, a polyol compound and the like can be exemplified.

The content of (b) the crosslinking agent in the ink composition for screen printing according to the present invention is preferably 1.5 to 15.0 mass %, more preferably 2.0 to 10.0 mass % and still more preferably 3.0 to 8.0 mass %.

When the ink composition for screen printing according to the present invention contains (b) the crosslinking agent within the above-described range, it is possible to suitably crosslink the rubber component in (a) the rubber-forming component.

The ink composition for screen printing according to the present invention contains (c) the main solvent that dissolves the rubber-forming component.

In the ink composition for screen printing according to the present invention, (c) the main solvent that dissolves the rubber-forming component is not particularly limited as long as the main solvent is capable of dissolving (c) the rubber-forming component, and, for example, in a case where the rubber component is ethylene-propylene-diene rubber (EPDM), one or more selected from aromatic hydrocarbons such as toluene, benzene, styrene and xylene, and aliphatic hydrocarbons such as hexane, heptane, octane, nonane, decane, undecane and dodecane can be exemplified.

In the present application document, “dissolving the rubber-forming component” means that, when a 1 mm-thick rubber-forming component molded into a sheet is cut into a square that is 5 mm in length and 5 mm in width, and the obtained cut piece and the main solvent are introduced in proportions of 1:9 in terms of weight ratio, stirred with a stirrer for 12 hours and then further left still for 12 hours, there is no undissolved residue found by visual observation.

In the ink composition for screen printing according to the present invention, (d) the poor solvent that dissolves in the main solvent but does not dissolve in the rubber-forming component can be selected as appropriate depending on the kind of (a) the rubber-forming component, and, for example, in a case where the rubber component is ethylene-propylene-diene rubber (EPDM), one or more selected from ester-based solvents such as diethylene glycol monoethyl ether acetate or butyl lactate, ether-based solvents and the like can be exemplified.

In the present application document, “dissolving in the main solvent” means that, when the main solvent and the poor solvent are mixed in proportions of 1:1 in terms of volume ratio and left still for 12 hours in a glass container, no emulsification or separation is found by visual observation.

In the present application document, “not dissolving in the rubber-forming component” means that, when the rubber-forming component containing 10 to 50 mass % of a colored filler such as carbon black and the poor solvent are introduced in proportions of 1:9 in terms of weight ratio, stirred with a stirrer for 12 hours and then further left still for 12 hours, there is no rubber-forming component (colored with the filler) in a dispersed state found by visual observation.

The ink composition for screen printing according to the present invention contains (d) the poor solvent together with (c) the main solvent, whereby the cohesion of the rubber-forming component in the ink composition is improved, the adhesion of the ink composition to screen masks is reduced, and the extrudability is improved, which makes it possible to effectively suppress the occurrence of print sagging.

In the ink composition for screen printing according to the present invention, the boiling points of (c) the main solvent and (d) the poor solvent are not particularly limited as long as the influence on continuous printability of drying during screen printing is small and drying during drying is not difficult and are preferably 170° C. to 220° C., more preferably 185° C. to 220° C. and still more preferably 200° C. to 220° C.

In the ink composition for screen printing according to the present invention, regarding the content ratio between (c) the main solvent that dissolves the rubber-forming component and (d) the poor solvent that dissolves in the main solvent but does not dissolve in the rubber-forming component, the mass ratio, which is represented by the ratio of (c) the main solvent that dissolves the rubber-forming component: (d) the poor solvent that dissolves in the main solvent but does not dissolve in the rubber-forming component, is preferably 80:20 to 97:3, more preferably 80:20 to 96:4 and still more preferably 85:15 to 95:5.

In the ink composition for screen printing according to the present invention, the content ratio between (c) the main solvent that dissolves the rubber-forming component and (d) the poor solvent that dissolves in the main solvent but does not dissolve in the rubber-forming component is within the above-described range, whereby the cohesion of the rubber-forming component in the ink composition is improved, the adhesion of the ink composition to screen masks is reduced, and the extrudability is improved, which makes it possible to effectively suppress the occurrence of print sagging.

The ink composition for screen printing according to the present invention may contain, aside from (a) the rubber-forming component, (b) the crosslinking agent, (c) the main solvent that dissolves the rubber-forming component and (d) the poor solvent that dissolves in the main solvent but does not dissolve in the rubber-forming component, for example, one or more selected from a filler, a plasticizer, a dispersant, a crosslinking aid, an anti-foaming agent, a foaming agent and the like.

The total content of (c) the main solvent and (d) the poor solvent in the ink composition for screen printing according to the present invention is preferably 15.0 to 70.0 mass %, preferably 20.0 to 70.0 mass %, more preferably 35.0 to 65.0 mass % and still more preferably 40.0 to 60.0 mass %.

In the ink composition for screen printing according to the present invention, the viscosity (0.1/s) obtained with an E-type viscometer at a temperature of 25° C. is 300 to 50000 Pa·s, preferably 300 to 10000 Pa·s, more preferably 400 to 1000 Pa·s and still more preferably 450 to 900 Pa·s.

In the ink composition for screen printing according to the present invention, the viscosity (0.1/s) obtained with an E-type viscometer at a temperature of 25° C. is within the above-described range, whereby it is possible to more effectively suppress the occurrence of print sagging even in a case where a printed matter having a thick thickness has been formed.

In the present application document, the viscosity (0.1/s) obtained with an E-type viscometer at a temperature of 25° C. means a viscosity that is measured using an E-type viscometer (RHEOMETER MCR301 manufactured by Anton Paar GmbH) at a temperature of 25° C. under a condition of a shear rate of 0.1/s.

In the ink composition for screen printing according to the present invention, the viscosity (10/s) obtained with an E-type viscometer at a temperature of 25° C. is 50 to 1500 Pa·s, preferably 100 to 800 Pa·s and more preferably 100 to 500 Pa·s.

In the ink composition for screen printing according to the present invention, the viscosity (10/s) obtained with an E-type viscometer at a temperature of 25° C. is within the above-described range, whereby screen printing is possible while the printability is suitably guaranteed.

In the ink composition for screen printing according to the present invention, the loss tangent (0.1 rad/s) obtained with an E-type viscometer at a temperature of 25° C. is preferably 10.0 to 20.0, preferably 10.0 to 17.0 and more preferably 10.0 to 13.0.

In the ink composition for screen printing according to the present invention, the loss tangent (0.1 rad/s) obtained with an E-type viscometer at a temperature of 25° C. is within the above-described range, whereby the adhesion of the ink composition to screen masks is reduced, and the extrudability improves, which makes it possible to effectively suppress the occurrence of print sagging.

In the ink composition for screen printing according to the present invention, the loss tangent (0.1 rad/s) obtained with an E-type viscometer at a temperature of 25° C. can be easily controlled by adjusting the kinds and blending proportions of (c) the main solvent and (d) the poor solvent with respect to (a) the rubber-forming component and (b) the crosslinking agent.

In the present application document, the loss tangent (0.1 rad/s) obtained with an E-type viscometer at a temperature of 25° C. means a value obtained by measurement with an E-type viscometer (RHEOMETER MCR301 manufactured by Anton Paar GmbH) using a parallel plate (PP25) having a diameter of 25 mm under conditions of a sample thickness of 1 mm, 25° C., an angular frequency of 0.1 radians/second and a strain of 0.1% in a state where the ink composition for screen printing has been stirred for 12 hours or longer, it has been visually confirmed that there is no rubber-forming component left undispersed or undissolved and then air bubbles inside have been removed by vacuum defoaming.

A method for preparing the ink composition for screen printing according to the present invention is not particularly limited.

The ink composition for screen printing according to the present invention can be prepared by, for example, collecting each of (a) the rubber-forming component, (b) the crosslinking agent and, furthermore, other components as necessary in a desired amount, then, kneading the components using a well-known kneader such as an intermix, a kneader or a Banbury mixer or a well-known kneading device such as an open roll, furthermore, adding (c) the main solvent that dissolves the rubber-forming component and (d) the poor solvent that dissolves in the main solvent but does not dissolve in the rubber-forming component to the obtained kneaded matter and, furthermore, kneading the components using a well-known stirrer.

A method for screen printing using the ink composition for screen printing according to the present invention is as described in detail in the description of a method for producing a printed matter according to the present invention to be described below.

The ink composition for screen printing according to the present invention can be suitable used at the time of printing printed matters having a thick thickness by screen printing.

The ink composition for screen printing according to the present invention can be suitably used at the time of, for example, forming gaskets by screen printing and can be suitably used at the time of forming gaskets for fuel cells by screen printing.

According to the present invention, it is possible to provide an ink composition for screen printing that does not easily allow the generation of a printing defect or a rough surface portion in a printed matter even in the case of forming the printed matter having a thick thickness.

Next, a method for producing a printed matter of the present invention will be described.

The method for producing a printed matter of the present invention is characterized by screen-printing the ink composition for screen printing according to the present invention and then curing it to form a printed matter.

The details of the ink composition for screen printing according to the present invention, which is used in the method for producing a printed matter of the present invention, are as described above.

In the method for producing a printed matter of the present invention, for example, a procedure of the following (1) to (3) can be performed.

(1) As shown in a schematic cross-sectional view of FIG. 1, a screen mask S having a mask M in which an opening O for paste application having a predetermined pattern that corresponds to the planar shape of a printed matter intended to be obtained has been formed is disposed on the lower surface side of a screen S1 made of a stainless steel mesh or the like, and a substrate B is positioned and brought into contact with the lower surface of such a screen mask S.

(2) A paste 1 (the ink composition for screen printing according to the present invention) supplied to the upper part of the screen mask S is extruded into the opening O for paste application in the mask M by running a squeegee R and attached to the surface of the substrate B, then, the substrate B is separated from the screen mask S, and an applied paste layer P is formed on the surface of the substrate B in a predetermined printing pattern as shown in a schematic cross-sectional view corresponding to FIG. 2.

(3) The applied paste layer P is cured with heat or the like, thereby forming an intended printed matter on a substrate 1.

The thickness of the printed matter can be easily controlled by adjusting the thickness of the screen mask.

The thickness of the printed matter obtained by the production method according to the present invention is preferably 90 μm or more, more preferably 100 μm or more, still more preferably 100 to 150 μm and far still more preferably 100 to 120 μm.

In the present application document, the thickness of the printed matter means the maximum value when a cross section of the printed matter is cut out and eight points are measured with a microscope.

In the method for producing a printed matter of the present invention, since the ink composition for screen printing according to the present invention is used, it is possible to conveniently form a printed matter while the generation of a printing defect such as print sagging or a rough surface portion is suppressed even when the thickness of a printed matter to be obtained is thick.

In the method for producing a printed matter of the present invention, a gasket can be exemplified as the printed matter to be obtained, and a gasket for fuel cells can be exemplified as the gasket.

In a case where the printed matter that is obtained by the production method according to the present invention is a gasket for a fuel cell, a separator or the like constituting the fuel cell can be exemplified as the substrate forming the printed matter.

In a case where the substrate is a separator, it is possible to easily form an integrated matter of the separator and the gasket.

According to the present invention, it is possible to provide a method for producing a printed matter enabling a printed matter to be conveniently formed while the generation of a printing defect such as print sagging or a rough surface portion is suppressed even when the thickness of a printed matter to be obtained is thick.

Next, the present invention will be more specifically described using examples, which are simply examples and do not limit the present invention.

Example 1

As shown in Table 1, 31.3 parts by weight of ethylene propylene diene rubber 1 (EPDM1) as (a) a rubber-forming component, 3.1 parts by weight of (b) a crosslinking agent and 12.5 parts by weight of carbon black were kneaded with an open roll to produce a kneaded matter, 47.7 parts by weight of dodecane, which was (c) a main solvent, and 5.3 parts by weight of diethylene glycol monoethyl ether acetate (EDGAC), which was (d) a poor solvent, were further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 10.6, the viscosity (0.1/s) obtained with the E-type viscometer at a temperature of 25° C. was 886 Pa·s, and the viscosity (10/s) obtained with the E-type viscometer at a temperature of 25° C. was 584 Pa·s.

Screen printing was performed under the following conditions in the same manner as in Example 1 using the obtained ink composition for screen printing to obtain a gasket having a thickness of 102 μm, and the proportion of the ink composition adhering to a screen mask and the number of rough surface portions in the obtained printed matter were measured. The results are shown in Table 1.

(Screen Printing Method)

The ink composition for screen printing was supplied onto the screen mask (165 meshes/inch), opening parts of the screen mask were filled with the ink composition with a scraper, and then the ink composition filling the opening parts was transferred to a base material with a squeegee. The transferred ink composition was dried at 120° C. for 30 minutes with a hot air oven and then heated at 200° C. for 30 minutes to be crosslinked and cured, thereby obtaining an intended gasket.

(Proportion of Ink Composition Adhering to Screen Mask)

Four arbitrary sites in the printed part on the screen mask used during the screen printing were each observed at a magnification of 30 times using a microscope, and the degree of adhesion to the screen mask at each observation site was obtained by the following equation.

Degree of adhesion to screen mask=(the number of screen openings to which the ink composition adheres/the number of all screen openings except openings in the peripheral parts of the observation sites)×100

After that, the arithmetic average value of the degrees of adhesion was obtained as the proportion of the ink composition adhering to the screen mask, and the property of the ink composition for suppressing adhesion to the screen mask was evaluated according to the following standards.

O: The proportion of the ink composition adhering to the screen mask is 0% to 30%.

X: The proportion of the ink composition adhering to the screen mask is more than 30% and 100% or less.

The results are shown in Table 1.

(Number of Rough Surface Portions)

An arbitrary site on the surface of the gasket obtained by the screen printing was observed at a magnification of five times using a microscope, and (the number of rough surface portions such as screen marks/the total observation area)×100 in such an observation site was obtained as the number of rough surface portions.

The results are shown in Table 1.

Example 2

As shown in Table 1, 28.5 parts by weight of ethylene propylene diene rubber 1 (EPDM1) as (a) a rubber-forming component, 9.1 parts by weight of a plasticizer 1, 2.8 parts by weight of (b) a crosslinking agent and 11.4 parts by weight of carbon black were kneaded with an open roll to produce a kneaded matter, 43.4 parts by weight of dodecane, which was (c) a main solvent, and 4.8 parts by weight of diethylene glycol monoethyl ether acetate (EDGAC), which was (d) a poor solvent, were further added to the obtained kneaded matter and stirred with a stirrer, thereby preparing an ink composition for screen printing.

The polymer viscosity (0.1 rad/s) of the rubber-forming component was 35300 Pa·s.

In addition, for the obtained ink composition for screen printing, the loss tangent (0.1 rad/s) obtained with an E-type viscometer at a temperature of 25° C. was 16.5, the viscosity (0.1/s) obtained with the E-type viscometer at a temperature of 25° C. was 541 Pa·s, and the viscosity (10/s) obtained with the E-type viscometer at a temperature of 25° C. was 328 Pa·s.

Screen printing was performed in the same manner as in Example 1 using the obtained ink composition for screen printing to obtain a gasket having a thickness of 124 μm, and the proportion of the ink composition adhering to a screen mask and the number of rough surface portions in the obtained printed matter were measured in the same manner as in Example 1. The results are shown in Table 1.

Comparative Example 1

As shown in Table 1, 31.3 parts by weight of ethylene propylene diene rubber 1 (EPDM1) as (a) a rubber-forming component, 3.1 parts by weight of (b) a crosslinking agent and 12.5 parts by weight of carbon black were kneaded with an open roll to produce a kneaded matter, and 53.0 parts by weight of dodecane, which was (c) a main solvent, was further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 22.0, the viscosity (0.1/s) obtained with the E-type viscometer at a temperature of 25° C. was 596 Pa·s, and the viscosity (10/s) obtained with the E-type viscometer at a temperature of 25° C. was 375 Pa·s.

Screen printing was performed in the same manner as in Example 1 using the obtained ink composition for screen printing to obtain a gasket having a thickness of 106 μm, and the proportion of the ink composition adhering to a screen mask and the number of rough surface portions in the obtained printed matter were measured in the same manner as in Example 1. The results are shown in Table 1.

Example 3

As shown in Table 1, 35.9 parts by weight of ethylene propylene diene rubber 2 (EPDM2) as (a) a rubber-forming component, 3.6 parts by weight of (b) a crosslinking agent and 14.4 parts by weight of carbon black were kneaded with an open roll to produce a kneaded matter, 41.5 parts by weight of dodecane, which was (c) a main solvent, and 4.6 parts by weight of diethylene glycol monoethyl ether acetate (EDGAC), which was (d) a poor solvent, were further added to the obtained kneaded matter and stirred with a stirrer, thereby preparing an ink composition for screen printing.

The polymer viscosity (0.1 rad/s) of the rubber-forming component was 11900 Pa·s.

In addition, for the obtained ink composition for screen printing, the loss tangent (0.1 rad/s) obtained with an E-type viscometer at a temperature of 25° C. was 19.0, the viscosity (0.1/s) obtained with the E-type viscometer at a temperature of 25° C. was 804 Pa·s, and the viscosity (10/s) obtained with the E-type viscometer at a temperature of 25° C. was 532 Pa·s.

Screen printing was performed in the same manner as in Example 1 using the obtained ink composition for screen printing to obtain a gasket having a thickness of 117 μm, and the proportion of the ink composition adhering to a screen mask and the number of rough surface portions in the obtained printed matter were measured in the same manner as in Example 1. The results are shown in Table 1.

Comparative Example 2

As shown in Table 1, 23.8 parts by weight of ethylene propylene diene rubber 3 (EPDM3) as (a) a rubber-forming component, 2.4 parts by weight of (b) a crosslinking agent and 9.5 parts by weight of carbon black were kneaded with an open roll to produce a kneaded matter, and 64.3 parts by weight of dodecane, which was (c) a main solvent, was further added to the obtained kneaded matter and stirred with a stirrer, thereby preparing an ink composition for screen printing.

The polymer viscosity (0.1 rad/s) of the rubber-forming component was 300000 Pa·s.

In addition, for the obtained ink composition for screen printing, the loss tangent (0.1 rad/s) obtained with an E-type viscometer at a temperature of 25° C. was 25.0, the viscosity (0.1/s) obtained with the E-type viscometer at a temperature of 25° C. was 572 Pa·s, and the viscosity (10/s) obtained with the E-type viscometer at a temperature of 25° C. was 349 Pa·s.

Screen printing was performed in the same manner as in Example 1 using the obtained ink composition for screen printing to obtain a gasket having a thickness of 65 μm, and the proportion of the ink composition adhering to a screen mask and the number of rough surface portions in the obtained printed matter were measured in the same manner as in Example 1. The results are shown in Table 1.

Example 4

As shown in Table 1, 31.3 parts by weight of ethylene propylene diene rubber 2 (EPDM2) as (a) a rubber-forming component, 3.1 parts by weight of (b) a crosslinking agent and 12.5 parts by weight of carbon black were kneaded with an open roll to produce a kneaded matter, and 45.1 parts by weight of dodecane, which was (c) a main solvent, and 8.0 parts by weight of butyl lactate, which was (d) a poor solvent, were further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 10.7, the viscosity (0.1/s) obtained with the E-type viscometer at a temperature of 25° C. was 850 Pa·s, and the viscosity (10/s) obtained with the E-type viscometer at a temperature of 25° C. was 438 Pa·s.

Screen printing was performed in the same manner as in Example 1 using the obtained ink composition for screen printing to obtain a gasket having a thickness of 91 μm, and the proportion of the ink composition adhering to a screen mask and the number of rough surface portions in the obtained printed matter were measured in the same manner as in Example 1. The results are shown in Table 1.

Example 5

As shown in Table 1, 28.0 parts by weight of ethylene propylene diene rubber 1 (EPDM1) as (a) a rubber-forming component, 2.8 parts by weight of (b) a crosslinking agent and 11.2 parts by weight of carbon black were kneaded with an open roll to produce a kneaded matter, 52.2 parts by weight of dodecane, which was (c) a main solvent, and 5.8 parts by weight of diethylene glycol monoethyl ether acetate (EDGAC), which was (d) a poor solvent, were further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 17.0, the viscosity (0.1/s) obtained with the E-type viscometer at a temperature of 25° C. was 310 Pa·s, and the viscosity (10/s) obtained with the E-type viscometer at a temperature of 25° C. was 210 Pa·s.

Screen printing was performed in the same manner as in Example 1 using the obtained ink composition for screen printing to obtain a gasket having a thickness of 102 μm, and the proportion of the ink composition adhering to a screen mask and the number of rough surface portions in the obtained printed matter were measured in the same manner as in Example 1. The results are shown in Table 1.

Comparative Example 3

As shown in Table 1, 28.0 parts by weight of ethylene propylene diene rubber 1 (EPDM1) as (a) a rubber-forming component, 2.8 parts by weight of (b) a crosslinking agent and 11.2 parts by weight of carbon black were kneaded with an open roll to produce a kneaded matter, and 58.0 parts by weight of dodecane, which was (c) a main solvent, was further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 47.1, the viscosity (0.1/s) obtained with the E-type viscometer at a temperature of 25° C. was 154 Pa·s, and the viscosity (10/s) obtained with the E-type viscometer at a temperature of 25° C. was 127 Pa·s.

Screen printing was performed in the same manner as in Example 1 using the obtained ink composition for screen printing to obtain a gasket having a thickness of 81 μm, and the proportion of the ink composition adhering to a screen mask and the number of rough surface portions in the obtained printed matter were measured in the same manner as in Example 1. The results are shown in Table 1.

Comparative Example 4

As shown in Table 1, 31.4 parts by weight of ethylene propylene diene rubber 1 (EPDM1) as (a) a rubber-forming component, 3.1 parts by weight of (b) a crosslinking agent and 12.5 parts by weight of carbon black were kneaded with an open roll to produce a kneaded matter, and 53.0 parts by weight of decane, which was (c) a main solvent, was further added to the obtained kneaded matter and stirred with a stirrer, thereby preparing an ink composition for screen printing.

The polymer viscosity (0.1 rad/s) of the rubber-forming component was 237000 Pa·s.

In addition, for the obtained ink composition for screen printing, the loss tangent (0.1 rad/s) obtained with an E-type viscometer at a temperature of 25° C. was 17.2, the viscosity (0.1/s) obtained with the E-type viscometer at a temperature of 25° C. was 269 Pa·s, and the viscosity (10/s) obtained with the E-type viscometer at a temperature of 25° C. was 201 Pa·s.

Screen printing was performed in the same manner as in Example 1 using the obtained ink composition for screen printing to obtain a gasket having a thickness of 119 μm, and the proportion of the ink composition adhering to a screen mask and the number of rough surface portions in the obtained printed matter were measured in the same manner as in Example 1. The results are shown in Table 1.

Example 6

As shown in Table 1, 28.5 parts by weight of ethylene propylene diene rubber 1 (EPDM1) as (a) a rubber-forming component, 9.1 parts by mass of a plasticizer 2, 2.8 parts by weight of (b) a crosslinking agent and 11.4 parts by weight of carbon black were kneaded with an open roll to produce a kneaded matter, 43.4 parts by weight of dodecane, which was (c) a main solvent, and 4.8 parts by weight of diethylene glycol monoethyl ether acetate (EDGAC), which was (d) a poor solvent, were further added to the obtained kneaded matter and stirred with a stirrer, thereby preparing an ink composition for screen printing.

The polymer viscosity (0.1 rad/s) of the rubber-forming component was 31300 Pa·s.

In addition, for the obtained ink composition for screen printing, the loss tangent (0.1 rad/s) obtained with an E-type viscometer at a temperature of 25° C. was 19.9, the viscosity (0.1/s) obtained with the E-type viscometer at a temperature of 25° C. was 439 Pa·s, and the viscosity (10/s) obtained with the E-type viscometer at a temperature of 25° C. was 287 Pa·s.

Screen printing was performed in the same manner as in Example 1 using the obtained ink composition for screen printing to obtain a gasket having a thickness of 91 μm, and the proportion of the ink composition adhering to a screen mask and the number of rough surface portions in the obtained printed matter were measured in the same manner as in Example 1. The results are shown in Table 1.

TABLE 1

| | | Example 1 | Comparative Example 1 | Example 2 | Example 3 | Comparative Example 2 | Example 4 |
|---|---|---|---|---|---|---|---|
| Blending proportion (parts by weight) | EPDM1 | 31.3 | 31.3 | 28.5 | — | — | 31.3 |
| | EPDM2 | — | — | — | 35.9 | — | — |
| | EPDM3 | — | — | — | | 23.8 | — |
| | Plasticizer 1 | — | — | 9.1 | — | — | — |
| | Plasticizer 2 | — | — | — | — | — | — |
| | Carbon black | 12.5 | 12.5 | 11.4 | 14.4 | 9.5 | 12.5 |
| | Crosslinking agent | 3.1 | 3.1 | 2.8 | 3.6 | 2.4 | 3.1 |
| | Dodecane | 47.7 | 53.0 | 43.4 | 41.5 | 64.3 | 45.1 |
| | Decane | — | — | — | — | — | — |
| | EDGAC | 5.3 | — | 4.8 | 4.6 | — | — |
| | Butyl lactate | — | — | — | — | — | 8.0 |
| Polymer viscosity of rubber-forming component (0.1 rad/s)[Pa · s] | | 237000 | 237000 | 35300 | 11900 | 300000 | 237000 |
| Physical properties | Loss tangent (0.1 rad/s) | 10.6 | 22.0 | 16.5 | 19.0 | 25.0 | 10.7 |
| | Ink viscosity (0.1/s) [Pa · s] | 886 | 596 | 541 | 804 | 572 | 850 |
| | Ink viscosity (10/s) [Pa · s] | 584 | 375 | 328 | 532 | 349 | 438 |
| Print thickness [μm] | | 102 | 106 | 124 | 117 | 65 | 91 |
| Number of rough surface portions [portions/cm$^2$] | | 0.845 | 2.748 | 0.034 | 0.021 | 2.812 | 0.652 |
| Property of suppressing adhesion to screen mask | | ○ | x | ○ | ○ | × | ○ |

TABLE 1-continued

| | | Example 5 | Comparative Example 3 | Comparative Example 4 | Example 6 |
|---|---|---|---|---|---|
| Blending proportion (parts by weight) | EPDM1 | 28.0 | 28.0 | 31.4 | 28.5 |
| | EPDM2 | — | — | — | — |
| | EPDM3 | — | — | — | — |
| | Plasticizer 1 | — | — | — | — |
| | Plasticizer 2 | — | — | — | 9.1 |
| | Carbon black | 11.2 | 11.2 | 12.5 | 11.4 |
| | Crosslinking agent | 2.8 | 2.8 | 3.1 | 2.8 |
| | Dodecane | 52.2 | 58.0 | — | 43.4 |
| | Decane | — | — | 53.0 | — |
| | EDGAC | 5.8 | — | — | 4.8 |
| | Butyl lactate | — | — | — | — |
| Polymer viscosity of rubber-forming component (0.1 rad/s)[Pa · s] | | 237000 | 237000 | 237000 | 31300 |
| Physical properties | Loss tangent (0.1 rad/s) | 17.0 | 47.1 | 17.2 | 19.9 |
| | Ink viscosity (0.1/s) [Pa · s] | 310 | 154 | 269 | 439 |
| | Ink viscosity (10/s) [Pa · s] | 210 | 127 | 201 | 287 |
| Print thickness [μm] | | 102 | 81 | 119 | 91 |
| Number of rough surface portions [portions/cm$^2$] | | 1.037 | 2.726 | 3.770 | 0.050 |
| Property of suppressing adhesion to screen mask | | ○ | x | x | ○ |

As shown in Table 1, it is found that the ink compositions for screen printing obtained in Example 1 to Example 6 contain (a) the rubber-forming component and (b) the cross-linking agent, have a viscosity (0.1/s) of 300 to 50000 Pa·s obtained with the E-type viscometer at a temperature of 25° C. and a viscosity (10/s) of 50 to 1500 Pa·s obtained with the E-type viscometer at a temperature of 25° C. and contain, as solvents constituting the ink composition for screen printing, (d) the poor solvent that dissolves in the main solvent but does not dissolve in the rubber-forming component together with (c) the main solvent that dissolves the rubber-forming component, whereby the cohesion of the rubber-forming component in the ink composition is effectively improved by controlling the loss tangent (0.1 rad/s) obtained with the E-type viscometer to 10.0 to 20.0, and the extrudability can be improved by suppressing the adhesion amount of the ink composition during screen printing.

In addition, as shown in Table 1, it is found that the ink compositions for screen printing obtained in Example 1 to Example 3 contain, as solvents constituting the ink composition for screen printing, (c) the main solvent and (d) the poor solvent, and (d) the poor solvent volatilizes during a drying treatment or during a heating and curing treatment with (b) the crosslinking agent after screen printing, whereby the viscosities of extruded matters during drying reduce compared with those immediately after extrusion with the screen mask, the leveling property (surface flatness) is easily improved, and the number of rough surface portions can be reduced.

In contrast, as shown in Table 1, it is found that the ink compositions for screen printing for comparison obtained in Comparative Example 1 to Comparative Example 4 do not contain (d) the poor solvent that dissolves in the main solvent but does not dissolve in the rubber-forming component together with (c) the main solvent that dissolves the rubber-forming component, and thus the adhesion amounts of the ink composition during screen printing are high, additionally, it is not possible to improve the leveling properties (surface flatness) of extruded matters after extrusion with the screen mask, and the numbers of rough surface portions exhibit high numerical values.

INDUSTRIAL APPLICABILITY

According to the present invention, it is possible to provide an ink composition for screen printing that does not easily allow the generation of a printing defect or a rough surface portion in a printed matter even in the case of forming the printed matter having a thick thickness and a method for producing a printed matter using such an ink composition for screen printing.

REFERENCE SIGNS LIST

1 Paste
M Mask
S Screen mask
S1 Screen
O Opening
B Substrate
R Squeegee
P Applied paste layer

The invention claimed is:

1. An ink composition for screen printing comprising:
(a) a rubber-forming component;
(b) a crosslinking agent;
(c) a main solvent that dissolves the rubber-forming component; and
(d) a poor solvent that dissolves in the main solvent but does not dissolve in the rubber-forming component,
wherein a viscosity at a shear rate of 0.1/s obtained with an E-type viscometer at a temperature of 25° C. is 300 to 50000 Pa·s,
a viscosity at a shear rate of 10/s obtained with the E-type viscometer at a temperature of 25° C. is 50 to 1500 Pa·s, and
a loss tangent at an angular frenquency of 0.1 rad/s obtained with the E-type viscometer at a temperature of 25° C. is 10.0 to 20.0.

2. A method for producing a printed matter, wherein the ink composition for screen printing according to claim 1 is screen-printed and then cured, thereby forming a printed matter.

3. The method for producing a printed matter according to claim 2, wherein the printed matter is a gasket.

* * * * *